United States Patent
Vedady Moghadam Nanehkaran et al.

(10) Patent No.: US 11,159,058 B2
(45) Date of Patent: Oct. 26, 2021

(54) WIRELESS POWER TRANSMISSION

(71) Applicant: TRANSFERFI PTE. LTD., Singapore (SG)

(72) Inventors: Mohammad Reza Vedady Moghadam Nanehkaran, Singapore (SG); Aashish Mehta, Singapore (SG)

(73) Assignee: TRANSFERFI PTE. LTD., Singapore (SG)

( * ) Notice: Subject to any disclaimer, the term of this patent is extended or adjusted under 35 U.S.C. 154(b) by 0 days.

(21) Appl. No.: 16/768,531

(22) PCT Filed: Nov. 30, 2018

(86) PCT No.: PCT/SG2018/050587
§ 371 (c)(1),
(2) Date: May 29, 2020

(87) PCT Pub. No.: WO2019/108137
PCT Pub. Date: Jun. 6, 2019

(65) Prior Publication Data
US 2020/0389054 A1 Dec. 10, 2020

(30) Foreign Application Priority Data
Dec. 1, 2017 (SG) .......................... 10201710000U (51) Int. Cl.
*H02J 50/23* (2016.01)
*H02J 50/80* (2016.01)
*H02J 50/40* (2016.01)
*H02J 7/00* (2006.01)
*H02J 7/04* (2006.01)
(Continued)

(52) U.S. Cl.
CPC ............ *H02J 50/23* (2016.02); *H02J 7/0047* (2013.01); *H02J 7/04* (2013.01); *H02J 7/345* (2013.01); *H02J 50/402* (2020.01); *H02J 50/80* (2016.02); *H04B 5/0037* (2013.01);
(Continued)

(58) Field of Classification Search
CPC ................................. H02J 50/23; H02J 50/80
See application file for complete search history.

(56) References Cited

U.S. PATENT DOCUMENTS 9,793,758 B2 * 10/2017 Leabman ................ H02J 50/20
9,825,674 B1 11/2017 Leabman
(Continued)

OTHER PUBLICATIONS

Huang, Y. et al., "Waveform Design for Wireless Power Transfer with Limited Feedback", [online], <URL: <https://arxiv.org/pdf/1704.05400.pdf> [retrieved from Internet on Feb. 8, 2019] Published on Oct. 27, 2017 as per ARXIV.org.
(Continued)

*Primary Examiner* — Daniel Kessie
(74) *Attorney, Agent, or Firm* — Harness, Dickey & Pierce, P.L.C.

(57) ABSTRACT

Wireless power transmission methods, wireless power transmitters, wireless power receiving method, and wireless power receivers are disclosed. Wireless power is transmitted using power signal comprising a multi-sine waveform within a bandwidth to drive a plurality of antennas. Beamforming coefficients are generated and the relative phases of the power signal used to drive the antennas is controlled by the beam-forming coefficients.

15 Claims, 6 Drawing Sheets

(51) Int. Cl.
*H02J 7/34* (2006.01)
*H04B 5/00* (2006.01)
*H04B 7/06* (2006.01)

(52) U.S. Cl.
CPC ......... *H04B 7/0617* (2013.01); *H04B 7/0619* (2013.01); *H02J 2207/50* (2020.01)

(56) References Cited

U.S. PATENT DOCUMENTS

| | | | |
|---|---|---|---|
| 2011/0080267 A1* | 4/2011 | Clare | G01S 13/82 |
| | | | 340/10.4 |
| 2011/0205118 A1* | 8/2011 | Ojard | H01Q 25/00 |
| | | | 342/373 |
| 2014/0266892 A1 | 9/2014 | Schiller | |
| 2016/0079799 A1 | 3/2016 | Khlat | |
| 2017/0187249 A1 | 6/2017 | Zeine et al. | |
| 2017/0256994 A1* | 9/2017 | Joyce | H04B 5/0037 |
| 2017/0331330 A1* | 11/2017 | Yeo | H01Q 9/0407 |
| 2017/0331332 A1 | 11/2017 | Lee et al. | |
| 2018/0197559 A1* | 7/2018 | Orescanin | H04R 3/005 |
| 2018/0351406 A1* | 12/2018 | Lee | H02J 50/12 |
| 2019/0089207 A1* | 3/2019 | Kim | H02J 7/025 |

OTHER PUBLICATIONS

Boaventura, A. et al, "Boosting the Efficiency: Unconventional Waveform Design for Efficient Wireless Power Transfer", IEEE Microwave Magazine; vol. 16, Issue 3, Apr. 2015, pp. 87-96.

Huang, Y. et al., "Large-Scale Multiantenna Multisine Wireless Power Transfer", IEEE Transactions on Signal Processing, vol. 65, No. 21, Nov. 1, 2017, pp. 5812-5827.

Shi, L. et al, "Battery State Based Power and Time Allocation in Wireless Powered MIMO Uplink Transmission", 2016 IEEE 27th Annual IEEE International Symposium on Personal, Indoor and Mobile Radio Communications—(PIMRC), Sep. 4-6, 2016.

Choi, K. W., et al, "Received Power-Based Channel Estimation for Energy Beamforming in Multiple-Antenna RF Energy Transfer System", IEEE Transactions on Signal Processing, vol. 65, No. 6, Mar. 15, 2017, pp. 1461-1476.

Xu, J. et al., "A General Design Framework for MIMO Wireless Energy Transfer With Limited Feedback", IEEE Transactions on Signal Processing, vol. 64, No. 10, May 15, 2016, pp. 2475-2488.

International Search Report and Written Opinion of the International Searching Authiority issued in PCT/SG2018/050587, dated Feb. 12, 2019; ISA/AU.

Extended European Search Report regarding European Application No. 18883027.7, dated Mar. 11, 2021.

Xu Ji E et al: "Energy Beamforming With One-Bit Feedback" IEEE Transactions on Signal Processing, IEEE Service Center, New York, NY, US, vol. 62, No. 20, Oct. 1, 2014 (Oct. 1, 2014), pp. 5370-5381, XP011558242, ISSN: 1053-587X, DOI: 10.1109/TSP.2014.2352604 [retrieved on Sep. 5, 2014].

Bi Suzhi et al: "Distributed Charging Control in Broadband Wireless Power Transfer Networks" IEEE Journal on Selected Areas in Communications, IEEE Service Center, Piscataway, US, vol. 34, No. 12, Dec. 1, 2016 (Dec. 1, 2016), pp. 3380-3393, XP011638320, ISSN: 0733-8716, DOI: 10.1109/JSAC.2016.2611983 [retrieved on Dec. 29, 2016].

* cited by examiner

WIRELESS POWER TRANSMISSION

CROSS REFERENCE TO RELATED APPLICATIONS

This application is a U.S. National Phase Application under 35 U.S.C. 371 of International Application No. PCT/SG2018/050587 filed on Nov. 30, 2018, which claims the benefit of priority from Republic of Singapore Patent Application No. 10201710000U filed Dec. 1, 2017. The entire disclosures of each of the above applications are incorporated herein by reference.

FIELD

The present disclosure relates to wireless power transmission. In particular, the present disclosure relates to wireless power transmission which can be directed to one or more receivers.

BACKGROUND

Recent years have seen rapid growth in power and data networks related to the Industrial Internet of Things (IIoT). Such networks often require non-invasive sensor deployment in order to reduce the time for deployment, down time of machines, wiring infrastructure cost and enable placement of sensors in difficult-to-reach and hazardous areas. One option for powering sensors in depolyments is batteries. However require replacement when discharged and they are corrosive.

In view of this a method of transmitting power to over relatively large distances is required. Existing systems only allow for up to 5 meters charging, with no radio frequency (RF) beam steering technology. Using such systems for charging sensors over 25 meters distance will require a very high tranmitter power that will not pass safety regulation.

SUMMARY OF THE INVENTION

According to a first aspect of the present disclosure, a wireless power transmission method in a transmitter is provided. The wireless power transmission method comprises: receiving feedback information from a receiver, the feedback information comprising indications of signals received by antennas of the receiver from antennas of the transmitter; generating a power signal using the feedback information, the power signal comprising a multi-sine waveform within a bandwidth; generating beamforming coefficients indicating relative phases for a plurality of the antennas of the transmitter using the feedback information; and driving the plurality of antennas of the transmitter with the power signal with relative phases of the plurality of antennas of the transmitter controlled according to the beamforming coefficients.

The feedback information may comprise an indication of a charging rate of an energy storage device of the receiver.

The beamforming coefficients indicating relative phases for a plurality of the antennas of the transmitter may be generated using the feedback information comprises incrementally varying phase differences between the signals transmitted on the plurality of antennas to optimize the charging rate of the energy storage device of the receiver.

In an embodiment, the method further comprises determining coefficients for the multi-sine waveform that optimize the power received by the receiver in a channel training procedure.

In an embodiment, the channel training procedure is initiated in response to a channel training initiation signal received from the receiver, the channel training initiation signal indicating a drop in a charging rate of an energy storage device of the receiver.

In an embodiment, the method further comprises: receiving feedback information from a plurality of receivers, wherein the feedback information comprises an indication of signals received by antennas of the respective receiver from antennas of the transmitter and an indication of power usage or a stored power level at the respective receiver; determining a scheduling sequence for power transmission to each of the receivers using the received indications of power usage at the respective receivers; generating a power signal using the feedback information, the power signal comprising a multi-sine waveform within a bandwidth; generating beamforming coefficients indicating relative phases for a plurality of the antennas of the transmitter using the feedback information; and driving the plurality of antennas of the transmitter with the power signal with the relative phases of the plurality of antennas of the transmitter controlled according to the beamforming coefficients with timing according to the scheduling sequence.

The method may further comprise selecting a frequency range as the bandwidth. The frequency range may be selected using the feedback information. Alternatively, the frequency range is selected in response to a user input.

According to a second aspect of the present disclosure a wireless power transmitter is provided. The wireless power transmitter comprises: a plurality of power transmission antennas configured to wirelessly transmit power to a receiver; a wireless communication module configured to receive feedback information from the receiver, the feedback information comprising indications of signals received by antennas of the receiver from the plurality of antennas of the transmitter; a signal generator configured to generate a power signal comprising a multi-sine waveform within a bandwidth; a power signal optimizer configured to control the signal generator using the feedback information; a phase control logic configured to generate beamforming coefficients indicating relative phases for the plurality of the antennas of the transmitter using the feedback information; a splitter configured to split the power signal into a plurality of antenna signals each corresponding to respective antennas of the plurality of antennas; and a plurality of phase shifters configured to shift the relative phase of the antenna signals according to the beamforming coefficients such that the plurality of antennas of the transmitter are driven with the power signal with relative phases controlled according to the beamforming coefficients.

In an embodiment the feedback information comprises an indication of a charging rate of an energy storage device of the receiver.

The phase control logic may be configured to generate the beamforming coefficients by incrementally varying phase differences between the signals transmitted on the plurality of antennas to optimize the charging rate of the energy storage device of the receiver.

In an embodiment the wireless power transmitter further comprises a channel estimator configured to estimate channel state information for channels between the plurality of antennas of the transmitter and antennas of the receiver and wherein the power signal optimizer is configured to determining coefficients for the multi-sine waveform that optimize the power received by the receiver.

The channel estimator may be configured to initiate a channel training procedure in response to a channel training initiation signal received from the receiver, the channel training initiation signal indicating a drop in a charging rate of an energy storage device of the receiver.

The channel estimator may be configured to determine if the drop in charging rate was due to a scheduled change in target receiver and to initiate the channel training procedure if the drop was not due to a scheduled change in target receiver.

In an embodiment the wireless power transmitter further comprises: a smart scheduling logic configured generate a scheduling sequence for power transmission to each of a plurality of receivers using received indications of power usage at the respective receivers, wherein the smart scheduling logic is configured to control the phase control logic configured to generate beamforming coefficients indicating relative phases for the plurality of the antennas of the transmitter to generate coefficients with timing according to the scheduling sequence such that the power transmission antennas transmit power targeted at the plurality of receivers according to the scheduling sequence.

In an embodiment the wireless power transmitter further comprises a frequency selector configured to select a frequency range as the bandwidth. The frequency range may be selected using the feedback information. Alternatively, the frequency range may be selected in response to a user input.

According to a third aspect of the present disclosure, a feedback method in a wireless power receiver is provided. The method comprises: receiving a wireless power transmission signal from a transmitter at an antenna or a plurality of antennas of the wireless power receiver; monitoring a charging rate in an energy storage device coupled to the antenna or plurality of antennas; identifying a change in the charging rate; and sending a channel training initiation signal to the transmitter.

According to a fourth aspect of the present disclosure, a wireless power receiver is provided. The wireless power receiver comprises: a plurality of antennas configured to receive a wireless power transmission signal from a transmitter; an energy storage device coupled to the plurality of antennas; a monitoring unit configured to monitor a charging rate of the energy storage device; a channel estimator configured to identify a drop in the charging rate of the energy storage device and generate a channel training initiation signal; and a wireless communication module configured to send the channel training initiation signal to the transmitter.

The wireless power receiver may comprise one or more RF-to-DC rectifiers which convert the wireless power transmission signal from an RF signal to DC power.

In an embodiment, the channel estimator is further configured to cause the plurality of antennas to generate a pilot signal.

BRIEF DESCRIPTION OF THE DRAWINGS

In the following, embodiments of the present invention will be described as non-limiting examples with reference to the accompanying drawings in which.

DETAILED DESCRIPTION

Figure 1:
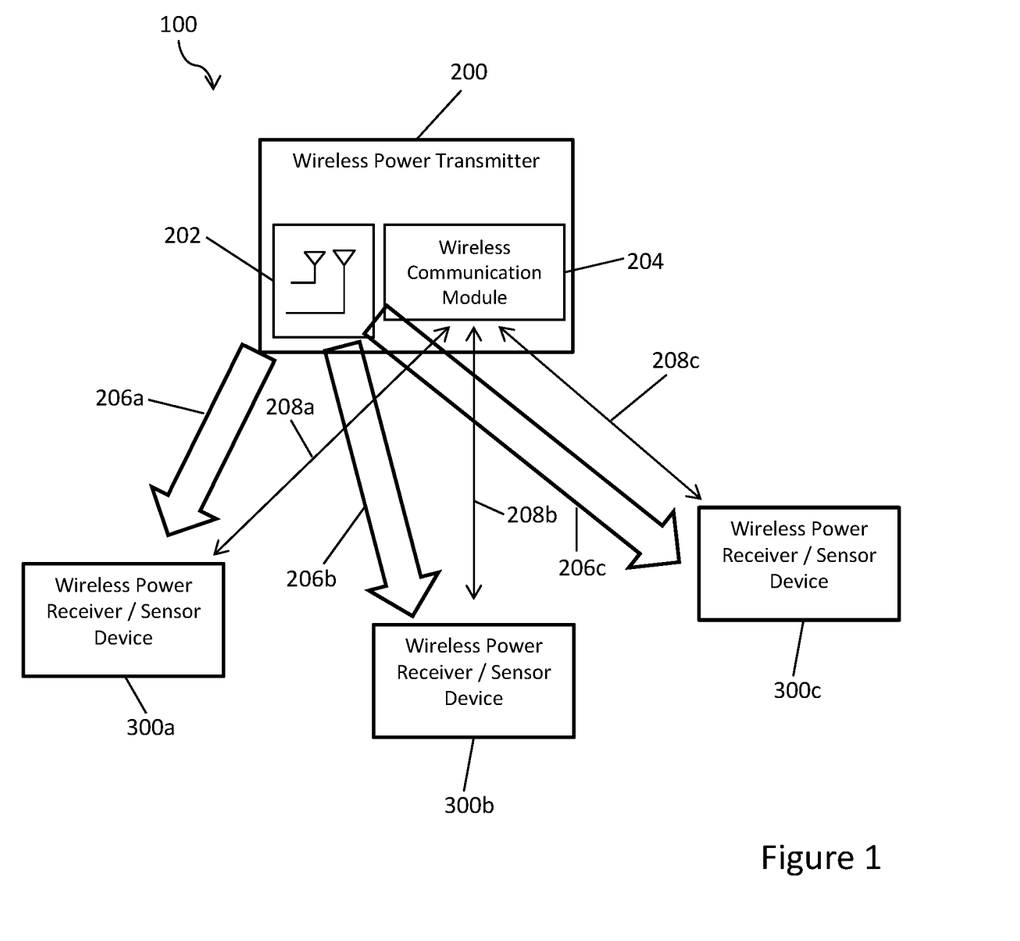
FIG. 1 shows a wireless power transmission system according to an embodiment of the present invention.

FIG. 1 is s block diagram showing a wireless power transmission system according to an embodiment of the present invention. The wireless power transmission system 100 may be part of a sensor network. The wireless power transmission system 100 comprises a wireless power transmitter 200 and a plurality of wireless power receivers 300a, 300b and 300c. The wireless power transmitter 200 comprises a plurality of transmitter antennas 202 which can be controlled by the wireless power transmitter 200 to transmit power over one or more radio frequency bands. The frequency may comprise conventional RF bands including 433 MHz, 915 MHz, 2.4 GHz, 5.8 GHz, or millimeter-wave bands including 26, 28, 38, and 60 GHz. The plurality of transmitter antennas 202 are controllable by the wireless power transmitter 200 to generate wireless power signals 206a, 206b and 206c directed towards respective wireless power receivers 300a, 300b and 300c. As will be described in more detail below, the wireless power transmitter 200 comprises control circuitry configured to generate drive signals for the plurality of transmitter antennas 202 to generated directed RF signals for each of the respective wireless power receivers 300a, 300b and 300c.

The wireless power transmitter 200 further comprises a wireless communication module 204. The wireless communication module 204 is configured to send and receive wireless information signals 208a, 208b and 208c from the wireless power receivers 300a, 300b and 300c. The wireless communication module 204 may be a Bluetooth module configured to send and receive signals according to the Bluetooth standard. Alternatively, the wireless communication module 204 may be a configured to send and receive signals according to the ZigBee, LoRa, WiFi, or Narrowband IoT (NB-IoT) communication protocols.

The wireless communication signals 208a, 208b and 208c transmitted from the wireless power receivers 300a, 300b and 300c comprise channel state information indicating information on the signal strength received by the respective wireless power receivers 300a, 300b and 300c from the respective wireless power signals 206a, 206b and 206c. Alternatively or additionally, the wireless communication signals 208a, 208b and 208c transmitted from the wireless power receivers 300a, 300b and 300c may comprise information on a charging or discharging rate of an energy storage device such as a battery, capacitor, or supercapacitor of the wireless power receiver 300a, 300b, or 300c. The wireless communication signals 208a, 208b and 208c may include commands transmitted from the wireless power transmitter 200 to the respective wireless receivers 300a, 300b and 300c. The commands may comprise instructions to control sensors, which form part of the wireless receivers 300a, 300b and 300c. The wireless communication signals 208a, 208b and 208c transmitted from the wireless power receivers 300a, 300b and 300c may also comprise indications of data sensed by sensors on the respective wireless power receivers 300a, 300b and 300c.

In some embodiments the wireless power signals 206a, 206b and 206c are transmitted according to a time division multiple access (TDMA) protocol to charge different wireless power receivers within a given scheduling time horizon (such as a 24 hour period). The wireless power signals 206a, 206b and 206c and the wireless communication signals 208a, 208b and 208c may have different frequency bands or may share the same frequency band. When the wireless power signals 206a, 206b and 206c and the wireless communication signals 208a, 208b and 208c share the same frequency band interference between the wireless power signals 206a, 206b and 206c and the wireless communication signals 208a, 208b and 208c may be managed though a time division multiple access (TDMA) protocol. In such a protocol, the wireless power transmission signals 206a, 206b and 206c and the wireless communication signals 208a, 208b and 208c are implemented over orthogonal time slots.

Figure 2:
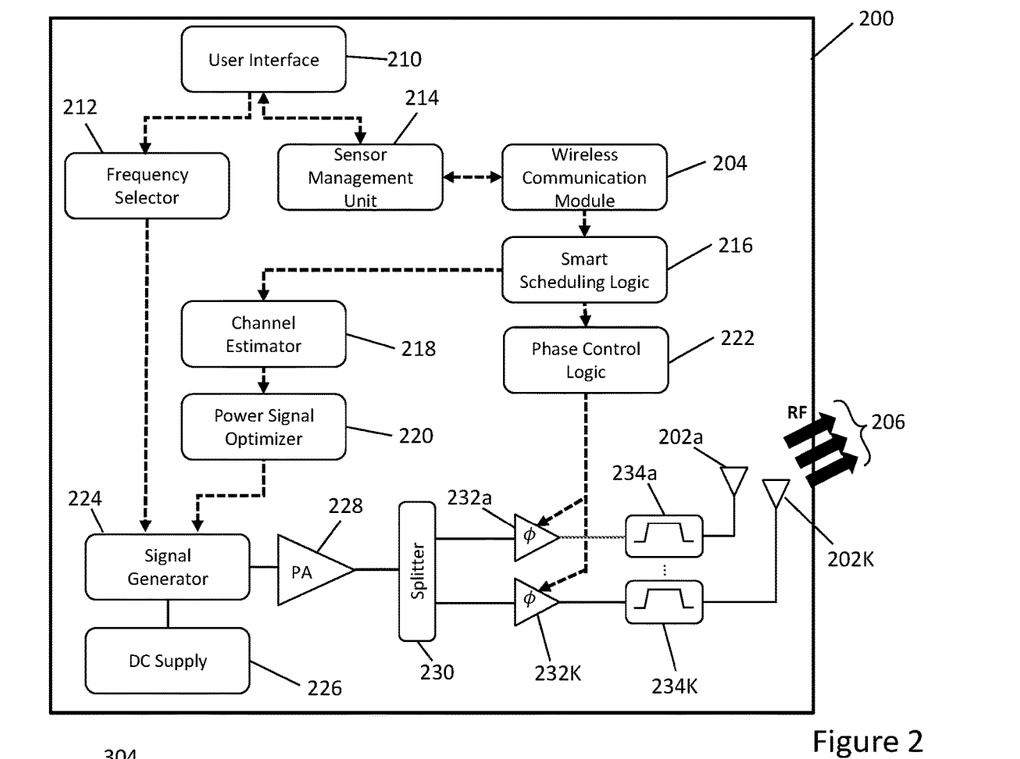
FIG. 2 is a block diagram showing a wireless power transmitter according to an embodiment of the present invention.

FIG. 2 is a block diagram showing a wireless power transmitter according to an embodiment of the present invention. The wireless power transmitter 200 shown in FIG. 2 corresponds to the wireless power transmitter 200 shown in FIG. 1. The blocks and modules of the wireless power transmitter 200 may be implemented as specifically programmed hardware components or as software running on a microprocessor device or as a combination of the two.

The wireless power transmitter 200 comprises a user interface module 210 which allows a user to input commands and selections. The user interface module 210 enables a user to select a frequency band for wireless power transfer from among a set of predefined bands, for example bands including 433 MHz, 915 MHz, 2.4 GHz, 5.8 GHz, 26, 28, 38, or 60 GHz. In some embodiments, the band for wireless power transmission may be selected automatically based on Channel State Information (CSI) for full autonomy. Other bands can be included/excluded according to the hardware specifications and local authority limitations. The user interface 210 also allows the user to communicate with the receiver via the wireless communication module 204.

The wireless power transmitter 200 further comprises a frequency selector 212. The frequency selector sets the center frequency of a signal generator 224 according to the power transmission frequency band selected by the user via the user interface module 210. Alternatively, the frequency selector 212 may select the frequency automatically based on the channel state information. The frequency selector 212 includes a RF switch connected to RF front-ends of different frequencies, where the switch selects one RF front-end upon a time based on the given command.

The wireless power transmitter 200 comprises a sensor management unit 214. The sensor management unit 214 is configured to extract information related to sensors connected to the wireless power receivers 300a, 300b and 300c from the information exchanged over the wireless communication channel through wireless communication signals 208a, 208b and 208c. The sensor management unit 214 stores this information either locally or on a cloud server, after which the end-user can access it. Moreover, the sensor management unit 214 enables the end-user remotely to configure parameters of each sensor, e.g., its sampling rate or accuracy level. The wireless communication signals 208a, 208b and 208c are received by the wireless communication module 204. The wireless communication signals 208a, 208b and 208c fed back from the wireless power receivers 300a, 300b and 300c may include an indication of the voltage across the Energy Storage System (ESS) at each receiver, and the current or power discharged/charged from/ to the ESS. The ESS can be a battery, or a super-capacitor/ capacitor. Such information is needed for managing power delivery to multiple receivers, as explained in more detail below.

The wireless communication module 204 may be a Bluetooth module, alternative communication modules such as ZigBee, LoRa, WiFi, or NB-IoT can be used instead of Bluetooth to realize the wireless feedback mechanism.

The wireless power transmitter 200 comprises a smart scheduling logic (SSL) 216 which controls which wireless power receiver (or which set of wireless power receivers) are scheduled to receive wireless power transmission over time. Embodiments of the present invention adopt TDMA to deliver power to multiple receivers over different time slots within a certain scheduling time horizon, e.g., next 24 hours. At each time slot, transmitter power signals are directed towards one receiver or a cluster of receivers which are in close vicinity. Based on the current and future power charging/discharging values of receivers' ESSs as well as the state of charge (SoC) of ESSs, the SSL 216 prioritizes the sequence of power delivery to different receivers. Particularly, the SSL 216 determines when and for how long each receiver needs to be wirelessly charged such that it has enough energy stored in its ESS to smoothly run over the given scheduling time horizon. To achieve this goal, the SSL 216 solves the following optimization problem (OP1) in real-time (or whenever needed):

$$\underset{\{P_u(t)\}}{\text{maximize}} \int_T \sum_{u=1}^{U} P_u(t) \, dt \quad \text{(OP-1)}$$

Subject to $SoC_{init,u} + P_u(t) - D_u(t) \geq \underline{SoC}_u, u = 1, \ldots, U$ $p(t) \triangleq [P_1(t), \ldots P_U(t)] \in \Pi$ In OP1, the following notation is used:

| Notation | Definition |
| --- | --- |
| U | Number of receivers, indexed by u |
| $P_u(t)$ | Deliverable wireless power to receiver u at time t (i.e., ESS power charging value) |
| $D_u(t)$ | Discharged power from the ESS of receiver u at time t (i.e., ESS power discharging value) |
| $SoC_{init, u}$ | Initial state of charge of the ESS of receiver u |
| $\underline{SoC}_u$ | Minimum limit for the state of charge of the ESS of receiver u |
| p(t) | Vector of deliverable power to all receivers |
| Π | Set of all possible power vectors |

For p(t), the deliverable power to each receiver, which is also known as the power charging value of its ESS, set by the power signal optimizer (PSO) 220 and the phase control logic (PCL) 222 which are described below. For example, when the transmitter is beaming at receiver 1, by assuming that other receivers are sufficiently far from receiver 1, it follows that p(t)=[$P_1$ 0, . . . , 0] with $P_1$ denoting the instantaneous amount of power delivered to receiver 1 (i.e., the instantaneous power charging value of its ESS). Transmitter 1 feeds back the exact value of $P_1$ to the transmitter via the existing feedback communication channel.

A channel estimator 218, estimates the CSI, including both channel amplitude and phase, between any pair of transmitter and (selected) receiver antennas using the feedback mechanism. The training process involves the wireless power receiver 300 transmitting a known pilot signal to the wireless power transmitter 200. The channel estimator 218 then analyses the received pilot signal to estimate the CSI. This technique means that the CSI estimation calculation takes place on the wireless power transmitter 200 which reduces the processing load on the wireless power receiver 300. There are various CSI training techniques based on either least squares (LS) or minimum mean square error (MMSE). However, some embodiments use a novel mechanism to initiate CSI training in order to prevent unnecessary training and hence maximizing energy efficiency. This is described in more detail in FIG. 6.

A power signal optimizer (PSO) 220 controls the signal generator 224 to generate a multi-sine waveform as the power signal, which includes N sub-carriers (typically 8, 64, 256, 1024, or higher) with the total bandwidth BW that can be adjusted according to the hardware constraints and local authority rules and specifications (typically 100 KHz, 500 KHz, or higher). The baseband multi-sine signal over time t is given as:

$$\Sigma_{n=1}^{N} \sqrt{2} A_n \cos\left(2\pi \frac{BW}{N} n\, t\right). \quad (1)$$

The PSO 220 sets complex-valued amplitudes $A_n = \hat{A}_n \angle \theta_n$, n=1, ..., N by solving an optimization problem (OP-2). The objective of (OP-2) is to maximize the peak of aggregated signal collected by the receiver of our interests (i.e., the receiver selected by SSL for power delivery at the current time slot), subject to the signal generator's power budget, denoted by $P_{max} \geq 0$. By considering a single receiver is considered for power delivery, receiver index u is omitted from the following equations.

$$\underset{\{A_n\}}{\text{maximize}} \left| \sum_{k=1}^{K} \sum_{m=1}^{M} \sum_{n=1}^{N} \sqrt{2}\, G_{agg} A_n h_{k,m,n} \right| \quad \text{(OP-2)}$$

$$\text{Subject to } \Sigma_{n=1}^{N} A_n^2 \leq P_{max}$$

Other practical constraints such as peak to average power ratio (PAPR) constraints for the transmit signal, i.e., $$\frac{(\Sigma_{n=1}^{N} A_n)^2}{\Sigma_{n=1}^{N} A_n^2} \leq PAPR_{max},$$

can be added to (OP-2) if necessary.
In (OP-2) the following notation is used.

| Notation | Definition |
| --- | --- |
| $A_n$ | Amplitude of n-th sine wave, complex value |
| K | Number of transmitter antennas, indexed by k |
| M | Number of receiver antennas, indexed by m |
| $h_{k,m,n}$ | Channel between transmitter antenna k and receiver antenna m at n-th sub-carrier |
| $G_{agg}$ | Aggregate gain from transmitter/receiver antennas and transmitter power amplifier |
| $|.|$ | Absolute value operator |

One method of solving (OP-2) is as follows:
Let $h_n \triangleq \Sigma_{k=1}^{K} \Sigma_{m=1}^{M} h_{k,m,n}$, where $h_n$ is in general a complex-valued number and can be represented as $h_n = \hat{h}_n \angle \psi_n$. The solution to (OP-2) is set as $\theta_n = \psi_n$, n=1, ..., N, with $$\hat{A}_n = \hat{h}_n \sqrt{\frac{P_{max}}{\Sigma_{n=1}^{N} \hat{h}_n^2}}, n = 1, \dots, N. \quad (2)$$

In (OP-2), the number of sub-carriers N is set according to the structure of the RF-to-DC rectifier used in the considered receiver. Generally, larger N is needed when the forward voltage of the diode(s) or transistor(s) of the RF-to-DC rectifier of the wireless power receiver is larger (e.g., 0.7V). However, the maximum value for N is limited by the PAPR at the transmitter. Hence, N can be set according to the data available from the system while it can be updated in (OP-2) whenever necessary.

A second, sub-optimal solution to (OP-2) is given as equal-power allocation with zero phase $$A_n = \sqrt{\frac{P_{max}}{N}} \angle 0, n = 1, \dots, N.$$

This solution can be implemented for the case that CSI is not available or when the transmitter does not have sufficient computational resources to solve (OP-2) directly. A performance reduction as compared to the first solution is expected.

The above two solutions are implemented over the signal generator 224, which can be a Software Defined Radio (SDR). An entry-level SDR is sufficient to implement the multi-sine waveform when the allocated bandwidth is sufficiently small (typically below 1 MHz).

The output of the smart scheduling logic (SSL) 216 is used by a phase control logic (PCL) 222 to steer the power signal towards the receiver selected by SSL 216 at the current time slot.

The signal generator 224 uses a DC supply 226 to generate the baseband multi-sine signal. This signal is amplified by a power amplifier (PA) 228 and split into K signals by a splitter 230. The phase of each of the K signals is adjusted according to the output of the SSL 216 by phase controllers 232a to 232K. The resulting signals 234a to 234K are used to drive respective antennas 202a to 202K of the wireless power transmitter. Thus the antennas 202a to 202K produce a wireless power signal 206.

In some embodiments the charging power value of the receiver's ESS is used to adjust the phase of each transmitter antennas 202a to 202K. Alternatively, the change in the voltage across the ESS can be used. Under fixed load power consumption at the receiver, when the voltage across its ESS increases (decreases) it shows its charging power value also increases (decreases). Such information is shared via the existing wireless feedback channel. The process is explained in the following.

Figure 7:
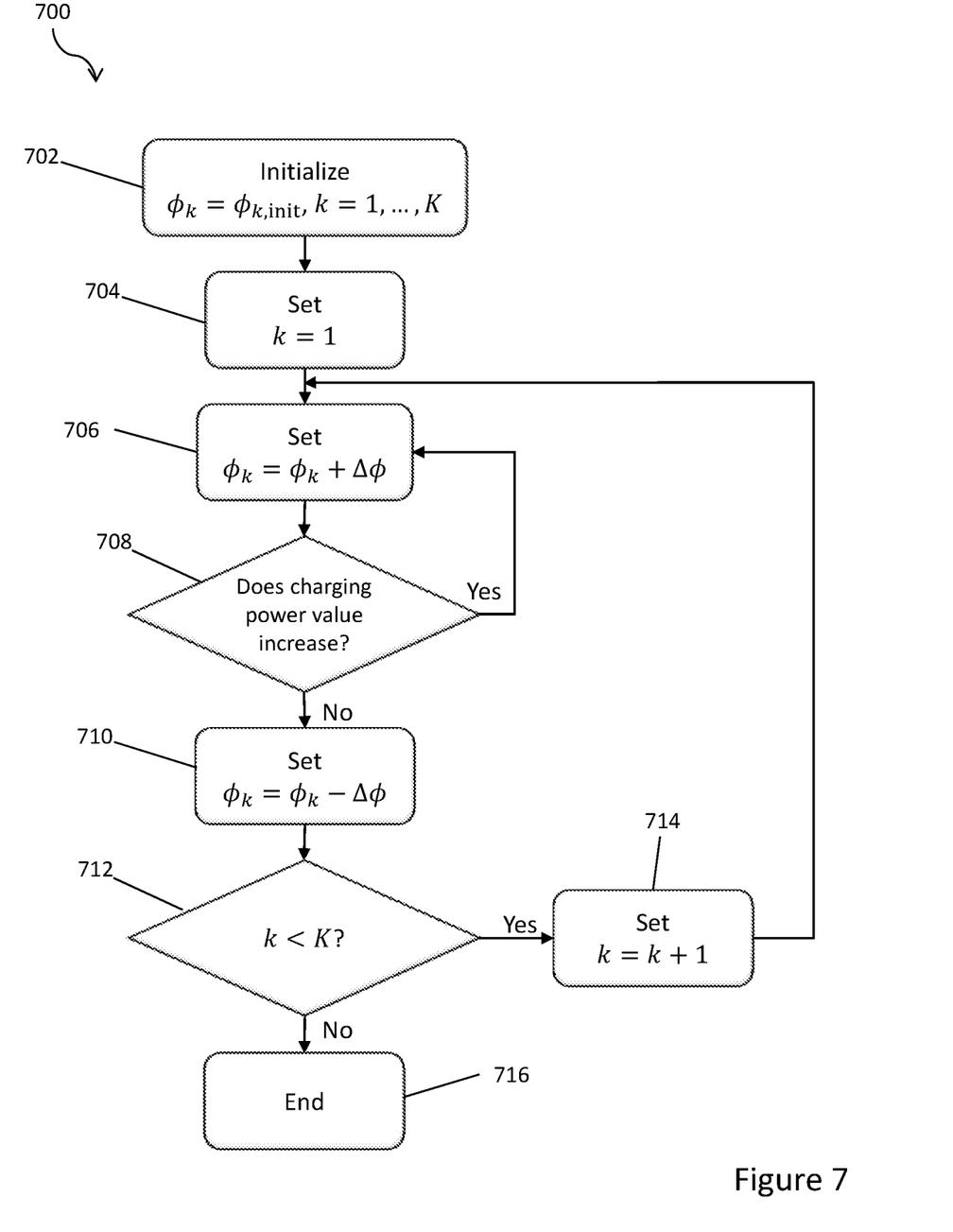
FIG. 7 is a flowchart showing phase control in a wireless power transmitter according to an embodiment of the present invention.

To achieve RF beam-steering, phases of signals 234a to 234K driving individual transmitter antennas are being adjusted with phase controllers 232a to 232K such that the deliverable power to the considered receiver is maximized, i.e., the charging power value of its ESS is maximized. As a starting point, the PCL 222 sets the phase of each transmitter antenna k, k∈{1, . . . , K}, as $$\phi_k = \phi_{k,init} \triangleq \frac{\sum_{m=1}^{M} \sum_{n=1}^{N} \psi_{k,m,n}}{M \times N},$$

with $\psi_{k,m,n}$ denoting the channel phase between transmitter antenna k and receiver antenna m at n-th sub-carrier (if CSI is not available, then $\phi_{k,init}=0$). With such an initial point, phases $\phi_k$ are gradually tuned as described with reference to the Flowchart shown in FIG. 7, with $\Delta\phi$ (typically $$|\Delta\phi| \leq \frac{\pi}{2})$$

denoting the step size for phase tuning. The above procedure may be repeated for multiple cycles to achieve the best beam-steering result.

In some embodiments, at each cycle of searching, $\Delta\phi$ decreases progressively to enhance the accuracy of the search. The obtained phase shift values can be saved in a look-up table to be used as an initial point to direct power signal towards the same receiver in the future.

The PCL 222 is capable of steering independent power signal beams to two or more receivers concurrently, but the wireless power transmitter 200 needs to have a large number of antennas spaced sufficiently far from each other (applicable to frequency bands of above 5.8 GHz which antennas are smaller). To achieve this goal, the transmitter antennas are firstly divided into two or more subsets, where each subset is assigned to steer a beam to one receiver.

Figure 3:
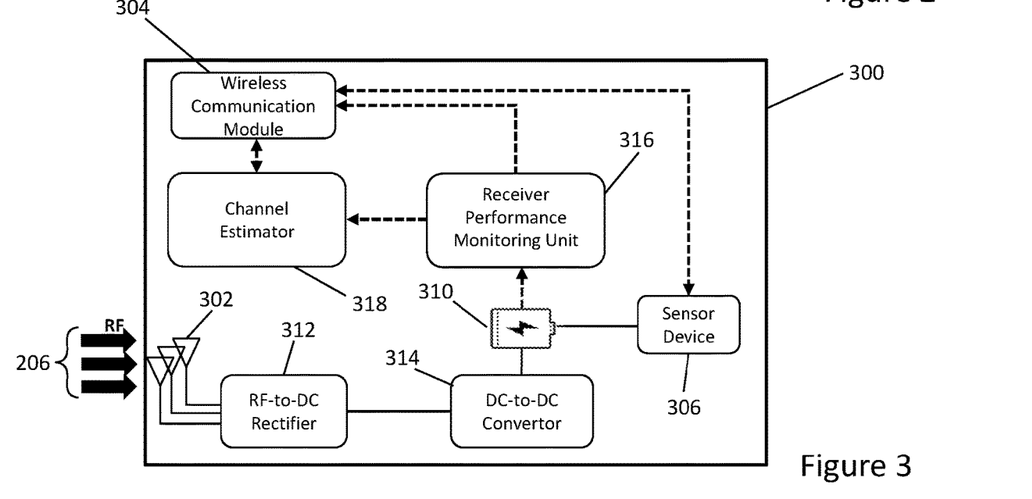
FIG. 3 is a block diagram showing a wireless power receiver according to an embodiment of the present invention.

FIG. 3 is a block diagram showing a wireless power receiver according to an embodiment of the present invention. The wireless power receiver 300 comprises a plurality of antennas 302 that are arranged to receive a wireless power signal 206 from the wireless power transmitter 200. The wireless power receiver 300 further comprises a wireless communication module 304 that allows communication over a wireless communication protocol with the wireless communication module 204 of the wireless power transmitter 200. As described above, the wireless communication may be a Bluetooth protocol, alternative communication protocols such as ZigBee, LoRa, WiFi, or IoT-NB can be used instead of Bluetooth to realize the wireless feedback mechanism. The blocks and modules of the wireless power receiver 300 may be implemented as specifically programmed hardware components or as software running on a microprocessor device or as a combination of the two.

The wireless power receiver 300 comprises a sensor device 306. The sensor device 306 can be any type of sensor and sensor data captured by the sensor device 306 is transmitted to the wireless power transmitter 200 via the wireless communication module 304.

The sensor device 306 is powered by an energy storage system (ESS) 310. The ESS can be a battery, or a supercapacitor/capacitor. The ESS 310 supplies power to the wireless power receiver 300 and is charged by power captured by the plurality of antennas 306 from the wireless power signal 206 transmitted by the wireless power transmitter 300.

The plurality of antennas 306 are coupled to an RF-to-DC rectifier 312 which converts the energy captured by the antennas 306 into a DC voltage. The RF-to-DC rectifier 312 is coupled to a DC-to-DC convertor 314 which converts the DC voltage output of the RF-to-DC rectifier 312 to a suitable voltage for charging the ESS 310.

A receiver performance monitoring unit (RPMU) 316 is coupled to the ESS 310. The RPMU 316 comprises a power measurement unit to monitor the power charging/discharging values of the ESS 310 in real time. The RPMU 316 is also configured to determine the State-of-Charge (SoC) of the ESS 310. This can be implemented by monitoring the Open Circuit Voltage (OCV) of the battery/supercapacitor/capacitor and then comparing it with a stored OCV-versus-SoC chart to estimate SoC. The voltage and charging/discharging current of the ESS 310 can be measured via separate sensors or a single power management IC, like INA220 from Texas Instruments, can be used to monitor both parameters.

The wireless power receiver 300 further comprises a channel estimator 318. The channel estimator 318 is paired to the channel estimator 218 of the wireless power transmitter 200. The channel estimator 218 of the wireless power receiver 300 stores a set of pre-defined pilot signals. During a channel estimation process, these pilot signals are transmitted by the plurality of antennas 302 of wireless power receiver 300 to the plurality of antennas 202 of the wireless power transmitter 200. The channel estimator 218 of the wireless power transmitter 200 uses the received pilot signals to estimate CSI of channels between the antennas 302 of the wireless power receiver 300 and the antennas 202 of the wireless power transmitter 200. The channel estimator 218 of the wireless power transmitter may use Maximum Likelihood (ML), least squares (LS) or minimum mean square error (MMSE) to find the CSI.

Figure 4:
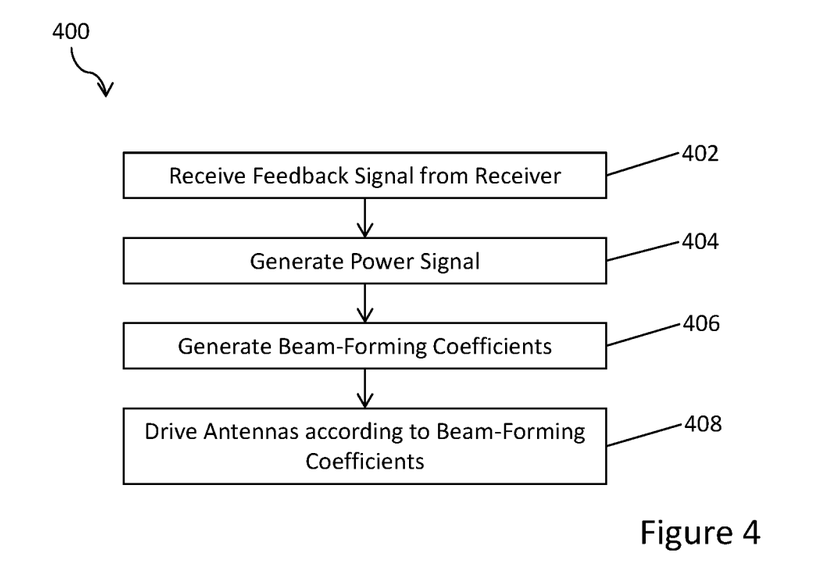
FIG. 4 is a flowchart showing a method of wireless power transmission according to an embodiment of the present invention.

FIG. 4 is a flowchart showing a method of wireless power transmission according to an embodiment of the present invention. The method 400 shown in FIG. 4 is implemented on the wireless power transmitter 200 shown in FIG. 2.

In step 402, the wireless communication module 204 of the wireless power transmitter 200 receives a feedback signal from the wireless power receiver 300. The feedback signal comprises indications of power signals received by antennas 302 of the wireless power receiver 300. The feedback signal may indicate the charging rate of the energy storage device 310 of the wireless power receiver 300.

In step 404, the power signal optimizer 220 of the wireless power transmitter 200 generates an indication of a power signal. The power signal is a multi-sine waveform and the power signal optimizer determines optimized amplitudes for subcarriers of the multi-sine waveform using the feedback information.

In step 406, the phase control logic 222 of the wireless power transmitter 200 generates beam-forming coefficients which indicate relative phases for the antennas 202 of the wireless power transmitter 200.

In step 408, the antennas 202 of the wireless power transmitter 200 are driven according to the beam-forming coefficients. The power signal optimizer 220 controls the signal generator 224 to generate the power signal. This power signal is then amplified by the power amplifier 228 and split into a signal for each antenna by the splitter 230. The phases of the signals for each of the antennas 202 are modified by phase shifters 232 according to the beam-forming coefficients. Then the phase shifted power signals are used to drive the respective antennas 202.

Figure 5:
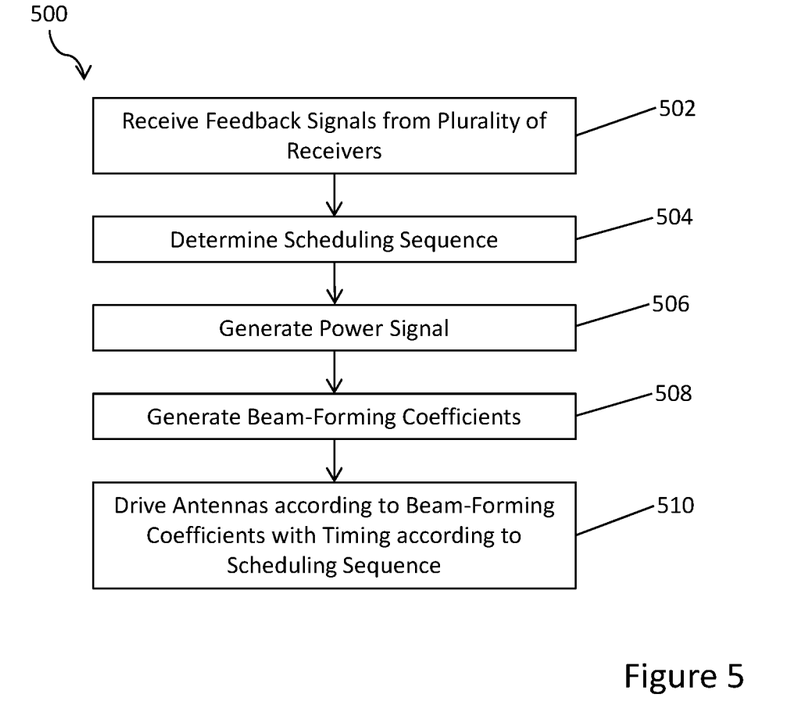
FIG. 5 is a flowchart showing a method of wireless power transmission to multiple wireless power receivers according to an embodiment of the present invention.

FIG. 5 is a flowchart showing a method of wireless power transmission to multiple wireless power receivers according to an embodiment of the present invention. The method 500 shown in FIG. 5 is implemented on the wireless power transmitter 200 shown in FIG. 2.

In step 502, the wireless communication module 204 of the wireless power transmitter 200 receives a feedback signal from the each of the wireless power receivers 300. The feedback comprises indications of power signals received by antennas 302 of the each of a plurality of wireless power receivers 300. The feedback also comprises indications of a power usage or stored power level at each of the wireless power receivers 300.

In step 504, the smart sequencing logic 216 of the wireless power transmitter 200 determines a scheduling sequence for power transmission to each of the wireless power receivers using the indication of the power usage or stored power level at each of the wireless power receivers 300.

In step 506, the power signal optimizer 220 of the wireless power transmitter 200 generates an indication of a power signal. The power signal is a multi-sine waveform and the power signal optimizer determines optimized amplitudes for subcarriers of the multi-sine waveform using the feedback information.

In step 508, the phase control logic 222 of the wireless power transmitter 200 generates beam-forming coefficients which indicate relative phases for the antennas 202 of the wireless power transmitter 200.

In step 510, the antennas 202 of the wireless power transmitter 200 are driven according to the beam-forming coefficients with timing according to the scheduling sequence. The power signal optimizer 220 controls the signal generator 224 to generate the power signal. This power signal is then amplified by the power amplifier 228 and split into a signal for each antenna by the splitter 230. The phases of the signals for each of the antennas 202 are modified by phase shifters 232 according to the beam-forming coefficients. The smart scheduling logic 216 controls the phase control logic 222 to generate the beam-forming coefficients corresponding to each of the wireless power receivers according to the scheduling sequence. Then the phase shifted power signals are used to drive the respective antennas 202.

Figure 6:
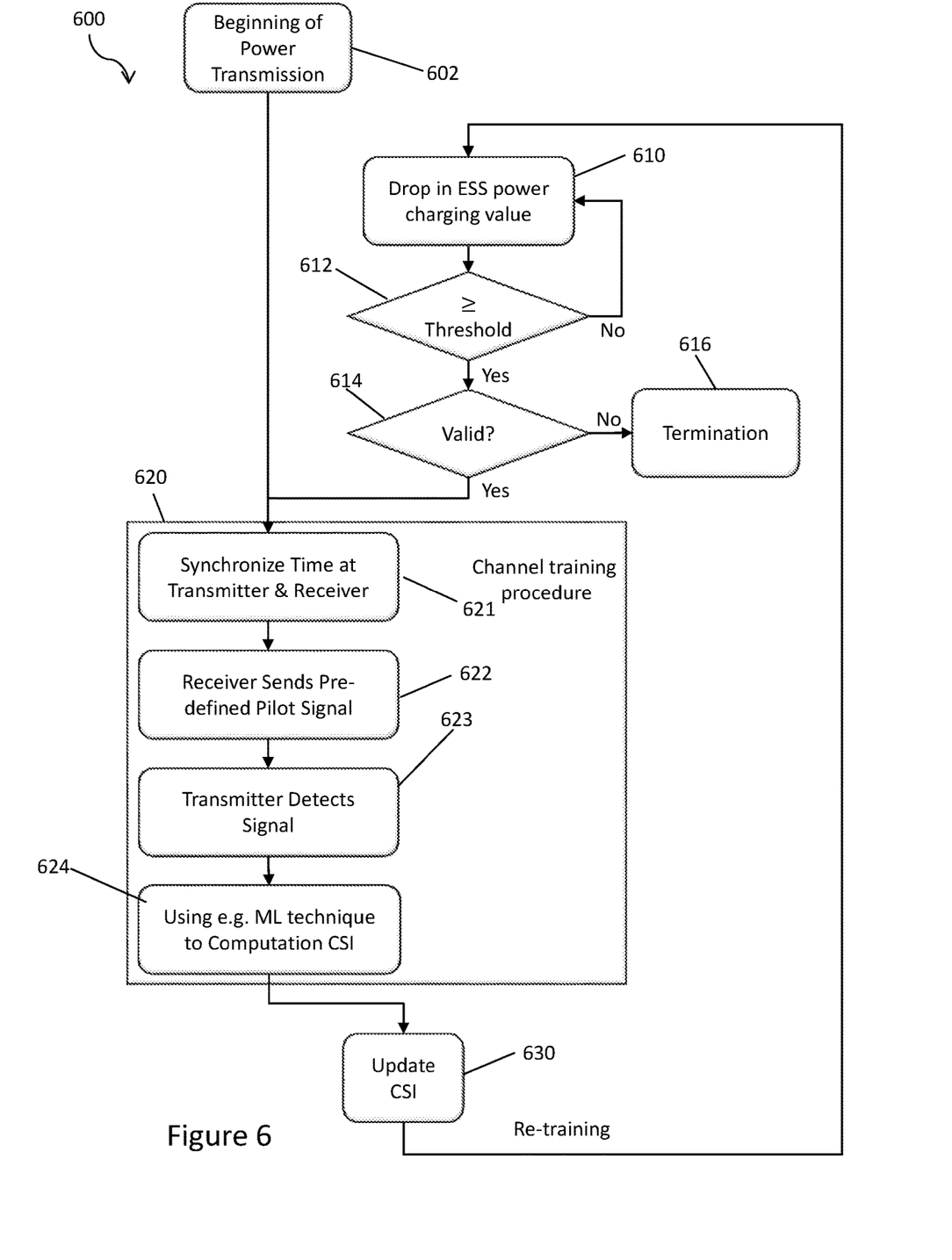
FIG. 6 is a flowchart showing a method of channel state estimation in a wireless power transmission system according to an embodiment of the present invention.

FIG. 6 is a flowchart showing a method of channel state estimation in a wireless power transmission system according to an embodiment of the present invention.

As shown in FIG. 6 the method 600 of channel state estimation comprises a channel training procedure 620. The channel training procedure 620 is initiated when the wireless power transmitter 200 starts the process of steering the power signal towards a receiver of interest at the beginning of power transmission 602. Subsequently, the channel training procedure 620 is started when the power charging value of the receiver's ESS suddenly reduces by more than a given percentage, set 20% by default. In this case, in step 610, a drop in ESS power charging value is identified. In step 612 the drop is compared with a threshold (for example 20%). If the drop is greater than the threshold, the wireless power transmitter 200 validates the request. The request is validated in step 614. To validate the request, the wireless power transmitter 200 determines whether the time slot allocated for delivering power this receiver has passed over or not. If the time slot is over, it means that the wireless power transmission towards this receiver is stopped intentionally, and no channel estimation is needed. Hence, the request is invalid, and a signal will send the receiver to not send any further request for channel re-training until the next session of charging, in this case, the method moves to step 616 and terminates. On the other hand, if the time slot is still not over, the sudden drop in the power charging value is mostly due to the outdated CSI (e.g., the receiver is moved and/or surrounding scatterers are moving). Hence, the request is valid and the method moves to the channel training procedure 620. The channel estimator 318 of the wireless power receiver 200 may carry out steps 610 and 612, namely identifying that there has been a drop in the ESS power charging value. A message may then be sent via the wireless communication module 304 of the wireless power receiver 300 to the wireless power transmitter 200, Upon receipt of this message, the channel estimator 218 of the wireless power transmitter 200 then determines in step 614 whether the drop was due to a scheduled change in transmission.

The channel training procedure 620 comprises the following steps. Initially, a timer at each of the wireless power transmitter 200 and the wireless power receiver 300 is synchronized in step 621. In step 622, the wireless power receiver 300 sends the pre-define pilot signal to the wireless power transmitter 200. The wireless power transmitter 200 detects the pilot signal in step 623. In step 624, the channel estimator 218 of the wireless power transmitter 200 uses the received pilot signal and a stored indication of the pilot signal to calculate channel CSI, explained in the following.

The channel estimator 218 of the wireless power transmitter 200 can use Maximum Likelihood (ML), least squares (LS) or minimum mean square error (MMSE) to find the CSI. CSI between transmit antenna k and receiver antenna m, is estimated as follows. The wireless power receiver 300 will send the following Q signals $$\sum_{n=1}^{N} A_{n,T_1} \cos\left(2\pi \frac{BW}{N} n t\right),$$
$$\sum_{n=1}^{N} A_{n,T_2} \cos\left(2\pi \frac{BW}{N} n t\right), \ldots , \sum_{n=1}^{N} A_{n,T_Q} \cos\left(2\pi \frac{BW}{N} n t\right)$$

in a given sequences. The complex valued constants $[A_{n,T_1}, A_{n,T_2}, \ldots, A_{n,T_Q}]$ are all known to the wireless power transmitter 200. Let represent signals received at the transmitter antenna k as $$\sum_{n=1}^{N} \tilde{A}_{n,T_1}^{k} \cos\left(2\pi \frac{BW}{N} n t\right),$$
$$\sum_{n=1}^{N} \tilde{A}_{n,T_2}^{k} \cos\left(2\pi \frac{BW}{N} n t\right), \ldots , \sum_{n=1}^{N} \tilde{A}_{n,T_Q}^{k} \cos\left(2\pi \frac{BW}{N} n t\right).$$

Let $h_{k,m} = [h_{k,m,1}, \ldots, h_{k,m,N}]$ denote the CSI vector between transmit antenna k and receiver antenna m. The CSI is estimated using ML as follows:

$$h_{k,m}^{ML} = \arg\min_{h_{k,m}} \sum_{n=1}^{N} \sum_{q=1}^{Q} \left(\tilde{A}_{n,T_q}^{k} - h_{k,m,n} A_{n,T_q}\right)^2$$

In step 630, the CSI is updated with the calculated values and the channel estimator 318 of the wireless power receiver 300 monitors the ESS power charging value to determine whether a drop occurs in which case the method moves to step 610.

FIG. 7 is a flowchart showing phase control in a wireless power transmitter according to an embodiment of the present invention. The method 700 shown in FIG. 7 is carried out by the phase control logic (PCL) 222 of the wireless power transmitter 200. To do so, in the PCL 222 executes the method shown in FIG. 7. In step 702, the phase of each transmitter antenna k, k∈{1, . . . , K}, is set as $$\phi_k = \phi_{k,init} \triangleq \frac{\sum_{m=1}^{M}\sum_{n=1}^{N}\psi_{k,m,n}}{M \times N},$$

with $\psi_{k,m,n}$ denoting the channel phase between transmitter antenna k and receiver antenna m at n-th sub-carrier (if CSI is not available, then $\phi_{k,init}$=0).

Then the method initializes the phase of the first antenna by setting k=1 in step 704. The phase $\phi_k$ is then gradually tuned by incrementing by Δϕ (typically $$|\Delta\phi| \leq \frac{\pi}{2})$$

in step 706. Then, in step 708 it is determined if the incremental increase in the phase results in an increase in power delivered. If the incremental increase in phase does result in an increase in power delivered, the method returns to step 706 and the phase is incremented again.

If the incremental increase in phase does not increase the power delivered, then the method moves to step 710 in which the previous incremental increase in phase is reversed and the phase for the kth antenna is set as the phase $\phi_k$ prior to the increase. Then in step 712 it is determined whether the phase for all antennas has been set. If the phase for all antennas has been set (i.e. if k=K) then the method ends in step 716. Otherwise, k is incremented in step 714 and the method is repeated for the kth antenna. The above procedure may be repeated for multiple cycles to achieve the best beam-steering result. At each cycle of searching, Δϕ decreases progressively to enhance the accuracy of the search.

The obtained phase shift values can be saved in a look-up table to be used as an initial point to steer the power signal towards the same receiver in the future.

The PCL 222 is capable of finding a single power signal beam which aims to maximize the weighted deliverable power to two or more receivers at the same time. Thus, in some embodiments, the question of step 708 is replaced by "Does the weighted charging power value of targeted receivers increase". For example, let $P_1$ and $P_2$ denote the instantaneous power delivered to receivers 1 and 2, respectively. In this case, the weighted power charging value of targeted receivers can be defined as $w_1P_1+w_2P_2$, where $w_1$ and $w_2$ are constants defined by the user. In this case, at each iteration, the change in $w_1P_1+w_2P_2$ is being monitored. Other objectives can be used as the decision metric in the PCL 222.

Figure 8:
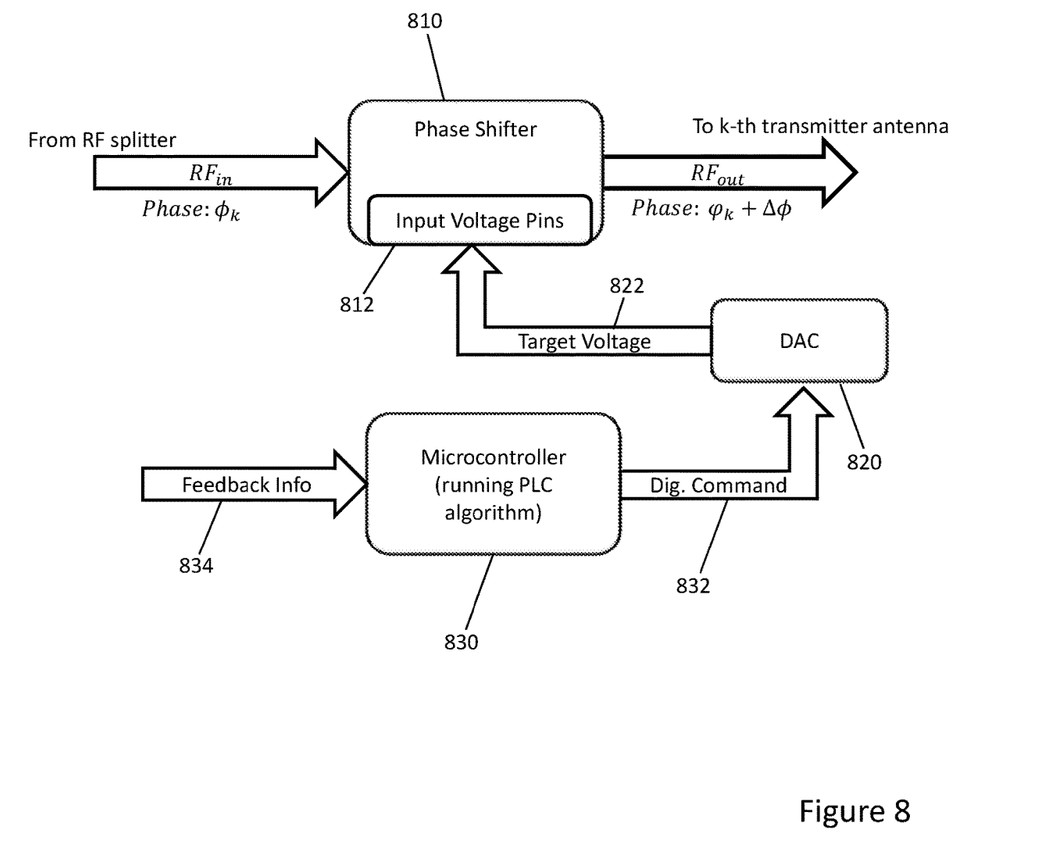
FIG. 8 is a block diagram showing a hardware implementation of phase control logic in a wireless power transmitter according to an embodiment of the present invention.

FIG. 8 is a block diagram showing one possible hardware implementation of phase control logic in a wireless power transmitter according to an embodiment of the present invention.

In the embodiment shown in FIG. 8, analog phase shifters 810 are used to implement the phase control logic 222 and control the phase of the signals for each of the antennas. One analog phase shifter 810 is used per transmitter antenna. In this embodiment, an analog phase shifter such as SPHSA-152+ from Mini-Circuits Inc., is used. The phase shift value for SPHSA-152+ is a function of its input voltage. As shown in FIG. 8, the input voltage pins 812 of the phase shifter 810 can be used to control the phase shift. To control the input voltage, a digital-to-analog converter (DAC) 820 is used, e.g., MCP4725 from Microchip Technology. A microcontroller 830 which runs the PCL 222 algorithm sends digital commands 832 to the DAC 820 to get the desired target voltage 822 across the input voltage pins 812 of the phase shifter 810. The proposed digitally-controlled analog phase shift control topology is of high accuracy. Specifically, with MCP4725 used as DAC, 4096 different phase values can be realized. Moreover, the proposed topology is scalable to a large number of transmitter antennas due to the fact that MCP4725 supports High-Speed I2C protocol and has non-volatile memory (EEPROM). Thus, multiple DACs can be controlled via a single microcontroller seamlessly.

As shown in FIG. 8, the microcontroller 830 receives feedback information 834 indicating the charging power of the ESS of the receiver being targeted and generates digital commands to vary the phase. The phase shifter 810 associated with the $k^{th}$ channel receives the RF input $RF_{in}$ from the splitter 230 and generates the phase shifted output signal $RF_{out}$ which is used to drive the $k^{th}$ antenna.

The embodiment described above with reference to FIG. 8 is particularly suited to sub-GHz systems. For high-frequency radio systems like 5.8 GHz and above, digital phase shifters are used to implement the PCL, for which a microcontroller (or FPGA, or Raspberry Pi, etc.) sends digital commands to each phase shifter to set its phase shift value directly.

After each phase shifter, a Power Amplifier (PA) may be used to boost the signal strength going to the antenna. Moreover, the power of PAs can be controlled using a similar procedure shown in FIG. 7 to enhance the beam-steering accuracy and reduce sidelobes.

Whilst the foregoing description has described exemplary embodiments, it will be understood by those skilled in the art that many variations of the embodiments can be made within the scope and spirit of the present invention.

The invention claimed is:

1. A wireless power transmission method, in a transmitter, the method comprising:
   receiving feedback information from a plurality of receivers, wherein the feedback information comprises for each respective receiver of the plurality of receivers, an indication of signals received by antennas of the receiver from antennas of the transmitter and an indication of power usage or a stored power level at the respective receiver;
   determining a scheduling sequence for power transmission to each of the receivers using the received indications of power usage at the respective receivers;
   generating a power signal using the feedback information, the power signal comprising a multi-sine waveform within a bandwidth;
   generating beamforming coefficients indicating relative phases for a plurality of the antennas of the transmitter using the feedback information; and
   driving the plurality of antennas of the transmitter with the power signal with relative phases of the plurality of antennas of the transmitter controlled according to the beamforming coefficients with timing according to the scheduling sequence.

2. A wireless power transmission method according to claim 1, wherein the feedback information further comprises an indication of a charging rate of an energy storage device of the respective receiver.

3. A method according to claim 2, wherein generating beamforming coefficients indicating relative phases for a plurality of the antennas of the transmitter using the feedback information comprises incrementally varying phase differences between the signals transmitted on the plurality of antennas to optimize the charging rate of the energy storage device of the respective receiver.

4. A method according to claim 1, further comprising determining coefficients for the multi-sine waveform that optimize the power received by the respective receiver in a channel training procedure.

5. A method according to claim 4, wherein the channel training procedure is initiated in response to a channel training initiation signal received from a respective receiver, the channel training initiation signal indicating a drop in a charging rate of an energy storage device of the respective receiver.

6. A wireless power transmission method according to claim 1, further comprising selecting a frequency range as the bandwidth.

7. A wireless power transmission method according to claim 6, wherein the frequency range is selected using the feedback information.

8. A wireless power transmission method according to claim 6, wherein the frequency range is selected in response to a user input.

9. A wireless power transmitter comprising:
- a plurality of power transmission antennas configured to wirelessly transmit power to a plurality of receivers;
- a wireless communication module configured to receive feedback information from respective receivers of the plurality of receivers, the feedback information comprising indications of signals received by antennas of a respective receiver from the plurality of antennas of the transmitter;
- a signal generator configured to generate a power signal comprising a multi-sine waveform within a bandwidth;
- a power signal optimizer configured to control the signal generator using the feedback information;
- a phase control logic configured to generate beamforming coefficients indicating relative phases for the plurality of the antennas of the transmitter using the feedback information;
- a splitter configured to split the power signal into a plurality of antenna signals each corresponding to respective antennas of the plurality of antennas;
    - a plurality of phase shifters configured to shift the relative phase of the antenna signals according to the beamforming coefficients such that the plurality of antennas of the transmitter are driven with the power signal with relative phases controlled according to the beamforming coefficients; and
- a smart scheduling logic configured to generate a scheduling sequence for power transmission to each of the plurality of receivers using received indications of power usage at the respective receivers,
wherein the smart scheduling logic is configured to control the phase control logic configured to generate beamforming coefficients indicating relative phases for the plurality of the antennas of the transmitter to generate coefficients with timing according to the scheduling sequence such that the power transmission antennas transmit power targeted at the plurality of receivers according to the scheduling sequence.

10. A wireless power transmitter according to claim 9, wherein the feedback information comprises an indication of a charging rate of an energy storage device of the respective receiver.

11. A wireless power transmitter according to claim 10 wherein the phase control logic is configured to generate the beamforming coefficients by incrementally varying phase differences between the signals transmitted on the plurality of antennas to optimize the charging rate of the energy storage device of the respective receiver.

12. A wireless power transmitter according to claim 9, further comprising a channel estimator configured to estimate channel state information for channels between the plurality of antennas of the transmitter and antennas of the receiver and wherein the power signal optimizer is configured to determining coefficients for the multi-sine waveform that optimize the power received by the respective receiver.

13. A wireless power transmitter according to claim 12 wherein the channel estimator is configured to initiate a channel training procedure in response to a channel training initiation signal received from the respective receiver, the channel training initiation signal indicating a drop in a charging rate of an energy storage device of the respective receiver.

14. A wireless power transmitter according to claim 13 wherein the channel estimator is configured to determine if the drop in charging rate was due to a scheduled change in target receiver and to initiate the channel training procedure if the drop was not due to a scheduled change in target receiver.

15. A wireless power transmitter according to claim 9, further comprising a frequency selector configured to select a frequency range as the bandwidth.

* * * * *